(12) United States Patent
King et al.

(10) Patent No.: US 6,327,062 B1
(45) Date of Patent: Dec. 4, 2001

(54) OPTICAL COMMUNICATION SYSTEM

(75) Inventors: F. David King, Richmond; Yves Tremblay, Nepean, both of (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/100,106

(22) Filed: Jun. 19, 1998

Related U.S. Application Data
(60) Provisional application No. 60/082,518, filed on May 21, 1998.

(51) Int. Cl.[7] .............................. H04B 10/00; H04B 10/04
(52) U.S. Cl. .................................................... 359/124
(58) Field of Search ..................... 359/133, 161, 359/124, 127, 134, 180, 188

(56) References Cited

U.S. PATENT DOCUMENTS

| | | | |
|---|---|---|---|
| 5,523,874 | * 6/1996 | Epworth | 359/161 |
| 6,055,078 | * 4/2000 | Chen | 359/130 |
| 6,118,561 | * 9/2000 | Maki | 359/124 |
| 6,252,716 | * 6/2001 | Paiam | 359/618 |

* cited by examiner

*Primary Examiner*—Jason Chan
*Assistant Examiner*—Agustin Bello
(74) *Attorney, Agent, or Firm*—Neil Teitelbaum

(57) ABSTRACT

A method and system is provided wherein an n channel system is equipped with n uncooled inexpensive lasers not requiring optical isolators provide optical signals to the n broad channels. Advantageously, the system can be installed at a reasonable cost to the first n users and be upgraded in number of channels and cost as the need for the system to evolve and grow arises. Each of the n uncooled lasers are tuned such that at ambient temperature, their central wavelength is below their respective channel mid wavelength.

20 Claims, 9 Drawing Sheets

MINIMUM FILTER BANDWIDTH

| | |
|---|---|
| * LASER (25-50C) | 3.8 nm |
| • TOLERANCE +/-0.5nm | 1.0 nm |
| • TEMP. DRIFT @ +0.1nm/c (25-50C) | 2.5nm |
| • AGING MARGIN +0.3nm | 0.3 nm |
| FILTER (0-50C) | 2.0nm |
| • TOLERANCE +/-0.8nm | 1.6 nm |
| • TEMP, DRIFT @ +0.004nm/C (0C-50C) | 0.2 nm |
| • AGING MARGIN +/-0.1nm | 0.2 nm |
| * MINIMUM FILTER BANDWIDTH | 5.8nm |

OPTICAL COMMUNICATION SYSTEM

This application claims benefit of Prov. No. 60/082,518 filed May 21, 1998.

FIELD OF THE INVENTION

This invention relates to a WDM optical communications system wherein uncooled lasers are utilized.

BACKGROUND OF THE INVENTION

Conventional Two-Fibre Transmission

FIG. 1 depicts a conventional two-fibre transmission link where blocks 101 and 102 can represent regeneration or central office sites. Connecting the two sites together is a fibre optic cable. Within the cable there are multiple strands of fibre 103, of which two have been shown. In this type of transmission system, communication from a transmitter (TX) at site A to a receiver (RX) at site B utilizes one signal wavelength ($\lambda 1$) and one strand of an optical cable. Communication in the opposite direction uses a different strand of the optical cable and the same, or different, wavelength ($\lambda 2$) to carry the signal.

Referring again to FIG. 1, sites A and B (101 and 102) can represent different site configurations. In one configuration, one terminal site might communicate directly to another terminal site in a complete end-to-end, communication system. Alternatively, FIG. 1 could represent a single link in a longer chain of transmission stations. In other words, sites A and B might be representative of a site C and a site D and a site E and so on, until a final site containing terminating transmission equipment is reached.

Depending upon the wavelength chosen for transmission, the strand of optical fibre 103 used may exhibit different attenuation characteristics which may limit the possible sparing of regenerator sites, e.g., sites A and B. Attenuation in a typical single-mode optical fibre is about 0.35 dB/kilometer at 1310 nanometer (nm) and about 0.25 dB/kilometer at 1550 nm. Thus, for systems operating at data rates of a few gigabits per second, regenerator sites could be spaced anywhere from about 35 to 45 kilometers when operating at 1310 nm and into the 70 to 80 kilometer range when operating at 1510 nm.

Wavelength-Division Multiplexer (WDM) Filters FIG. 2 depict a conventional narrow-band wavelength-division multiplexing communication system. Here, the term "narrow-band" is used to mean that more than one wavelength is utilized within the same transmission "window" of the optical fibre. For example, if the system is operating within a 1550 nm window, two signaling wavelengths of 1533 and 1557 nm might be used. For standard single mode fibre, the two main transmission "windows" of interest are 1310 nm and 1550 nm. Unlike the configuration shown in FIG. 1, communication between site A and site B in FIG. 2 is provided by a single strand of optical fibre 103. Bi-directional transmission is achieved through the utilization of wavelength-division multiplexing (WDM) filters, 201 and 203. (The devices 201 and 203 can be the same or slightly different devices, depending upon the manufacturing technique used to create them.) The purpose of WDM filters is to couple multiple wavelengths into (hereafter referred to as 'on') and out of (hereafter referred to as 'off') the transmission fibre. In the example shown, WDM filters 201 and 203 couple the two wavelengths 1557 and 1533 nm on and off a single fibre 103 of a fibre optic cable.

WDM Technology

There are several technologies that can be used to construct WDM filters. For example, etalon technology, defraction grading technology, fused biconic taper technology, and holographic filter technology. One technology that has proven to be widely useful in the telecommunications industry is dichroic filter technology. This technology offers wide channel passbands, flat channel passbands, low insertion loss, moderate isolation, low cost, high reliability and field ruggedness, high thermal stability, and moderate filter roll-off characteristics.

An illustrative example of a conventional three-port dichroic filter 300 is shown in FIG. 3. A dichroic filter is comprised of one or more layers of dielectric material coated onto a, for example, glass substrate 305 with lenses 310 to focus the incoming and outgoing optical signals. The choice of dielectric material, the number of dielectric layers coated onto the substrate, and the spacing of these layers are chosen to provide the appropriate transmissive and reflective properties for a given—target—wavelength. For example, if $\lambda 1$ is the target wavelength to be transmitted through the filter, the number and spacing of the dielectric layers on the substrate 305 would be chosen to provide (1) a specified passband tolerance around $\lambda 1$ and (2) the necessary isolation requirements for all other transmitted wavelengths, for example, a wavelength, $\lambda 2$, transmitted by a second transmitter.

The dichroic, or WDM, filter is constructed by placing self-focusing lenses, such as "SELFOC" lenses 310, on either side of the dielectric substrate 305. "SELFOC" lens 310 focuses incoming light ($\lambda 1$ and $\lambda 2$) to a particular location on the dielectric substrate.

Attached to the "SELFOC" lenses through an adhesive bonding process are, typically, single-mode optical fibers. For convenience, the locations at which optical fibers attach to the "SELFOC" lenses 310 are called ports: port 1 320, port 2 325, and port 3 330. Connected to the ports are optical fibers 335, 340, and 345 respectively.

For example, all of the fight (comprised of $\lambda 1$ and $\lambda 2$) passing through fiber 335 connected to port 1 320 is focused by lens 310 to a single location on the dielectric substrate 305.

Since the substrate is coated to pass wavelengths around $\lambda 1$, virtually all of the light at $\lambda 1$ passes through the dielectric substrate 305 and, via the second "SELFOC" lens, is collimated into port 3 330, and passes away from the filter on optical fiber 345. Any other wavelength incident on the filter through port 1 320 (e.g., light of wavelength $\lambda 2$) is reflected off the multilayer substrate, focused back through the first "SELFOC" lens to port 2 325, and passes away from the filter on optical fiber 340. Likewise, the filter performs the same function for light traveling in the opposite direction.

This technology could be used to, for instance, implement WDM filter 201 shown in FIG. 2.

FIG. 4 is a variation of the system shown in FIG. 1, a two-fiber design where one wavelength ($\lambda 1$) is transmitted on one fiber in one direction, and another (or possibly the same) wavelength ($\lambda 2$) is transmitted on the other fiber in the opposite direction. Erbium-doped fiber amplifiers (EDFAs) can be deployed along such a link in multiple locations: immediately following the transmitter (TX), making them post-amplifiers; immediately preceding a receiver (RX), making them pre-amplifiers; or between a transmitter and receiver, as shown in FIG. 4, making them line-amplifiers. Commercially available EDFA devices only operate in the 1550 nm window. Typically, in the line-amplifier configuration, regenerator spacing can be almost doubled, from approximately 70 to 80 kilometers to approximately 140 to 160 kilometers. (This analysis assumes typical filter attenuation and that at 80 kilometers the system is attenuation limited and not dispersion limited for distances less than 160 kilometers). Hence, if the cost of two EDFAs is less than the cost of a conventional fiber optics transmission system regenerator, the two EDFAs 401 and 403 can be used to reduce equipment deployment costs when constructing a transmission network such as that shown in FIG. 4.

Illustrative Systems

FIG. 5 depicts one configuration for a dual wavelength, bi-directional narrow-band WDM optical amplifier module, 901. Components used to construct the amplifier module 901 include: two WDMs, 201 and 203 (input and output ports of the amplifier module), and two EDFAs, 903 and 905, which can be either single-pumped or dual-pumped depending upon the communication system's power constraints/requirements. This line-amplifier configuration extends the regenerator spacing while providing bi-directional transmission utilizing a single-fibre strand of the cable facility 103.

It should be noted that the amplifier module 901 can be cascaded to extend even farther the distance between site A and site B. (The number of amplifiers that can be cascaded, between sites A and B, is limited by the dispersion characteristics of the transmission equipment deployed at sites A and B.)

Referring now to prior art FIG. 6, U.S. Pat. No. 5,452,124 describes a bi-directional amplifier module design that can be constructed utilizing a single EDFA. In this configuration, bi-directional transmission over a single optical fibre is achieved using four WDM filters. All signal wavelengths must pass unidirectionally through the EDFA 401 due to the constraint of using optical isolators in the EDFA 401 (refer to FIG. 5). Therefore, the two transmission wavelengths traveling in opposite directions, must be broken apart and recombined through WDM filters to pass unidirectionally through the EDFA. Similarly, the two amplified wavelengths must be broken apart and recombined through WDM filters to continue propagating toward their respective receiver sites. WDM filter 203 is constructed to bandpass 1557 nm and WDM filter 201 is constructed to bandpass 1553 nm.

Assuming a typical 1550 nm EDFA operational band, then going through FIG. 6 in a left-to-right direction we see a 1557 nm signal is transmitted from site A 101, through the east WDM filter 203, and onto the fibre cable 103. As the signal enters the amplifier module it is separated by the west WDM filter 201. (Each WDM filter in FIG. 6 has its external connection points labeled either 33 or 57. Connections labeled 33 carry optical signals at the 1533 nm wavelength. Connections labeled 57 carry optical signals at the 1557 nm wavelength.) The signal then travels to the east WDM filter 203 where it is routed into the EDFA amplifier 401. Upon leaving the EDFA, the 1557 nm signal is routed by another west WDM filter 201 to the amplifier module's output east WDM filter 203 where it is placed onto the fibre optic transmission cable 103. Finally, the signal leaves the transmission cable 103, enters the west WDM filter 201 at site B 102, and is routed to that site's receiver equipment. Signals transmitted from site B, at 1533 nm, take a different path through the WDM filters 201 and 203 and EDFA 401 on their way to site A's receiver. An advantage of this prior art embodiment over the configuration described in the earlier prior art of FIG. 5 is that only a single erbium-doped fibre amplifier is required. Because multiple wavelengths are being amplified by a single amplifier, it is sometimes preferable that the EDFA 401 in FIG. 6 uses a dual-pumped amplifier rather than a single-pumped amplifier. The additional gain provided by a dual-pumped EDFA could compensate for the signal strength lost by virtue of passing it through a number of additional elements.

For some time now, in North America, dense wavelength division multiplexed (WDM) systems having a plurality of channels transmitted on a single optical fibre have been used primarily in long-haul, backbone, Trans-Canada, Trans-United States systems. For example, between major cities in the United States and between major cities in Canada, there are fibre optic backbone routes several hundred kilometers long, having optical fibre amplifiers disposed periodically along these routes, wherein different channels are transmitted at different wavelengths on a single optical fibre.

In larger cities, for example in Toronto, large central offices exist having fibre optic links therebetween, and in some instances complicated mesh structures of optical fibre links exist between some of these central offices. It is also common for fibre optic cables to be provided from these central offices that offer high bit-rate links routed directly into office buildings via an optical fibre carrying data to and from their local PBX. Hence, fibre optic links exist from central office to central office and from central office trunks to private networks.

Currently, many such local installations do not support multi-wavelength multiplexed signals. These local installations are typically in the form of 1310 nm signals in one direction and 1310 nm signals in the other direction, similar to what is shown in FIG. 1, but wherein both optical fibres transmit and receive the same wavelength.

As of late, there is growing concern relating to utilization of optical fibre cable. The installation of additional optical fibre cables is a costly proposition. For example, on long-haul routes, right of ways must often be established and special trains capable of plowing beside a railway route are often required to add new cable on existing routes.

Thus, on long haul routes, between cities, wavelength division multiplexing has become an economically viable alternative.

However, within metropolitan areas, typical central offices may be 20 kilometers apart or less, and regenerators are not required. Adding new cable is a variable cost by length, and adding a short length has generally been considered more economically viable than adding wavelength division multiplexors and demultiplexors which are considered to be a fixed cost per channel.

So currently and in the past, it has been less expensive to provide short lengths of cable when required, than to implement a WDM system.

Notwithstanding these factors, there is now some interest in using multichannel technology. For example, when a new customer would like a connection to a central fibre cable, and the number of central fibres is limited, WDM systems are being considered. In this instance where some part of the trunk (central fibre cable) cannot support the branches (the customers) demanding the service, there exists a need for a cost effective WDM system.

It is an object of this invention to provide such a system.

It is an object of this invention to provide an optical transmission system wherein uncooled lasers are provided designed to operate in the absence of optical circulators such that the system is generally tolerant of back reflections that would otherwise cause a system having narrower channels to suffer from laser mode hop.

It is a further object of this invention to provide an evolvable system which as it evolves becomes gradually more expensive but at the same time is cost effective as the number of subscribers increases beyond some predetermined number.

Hence it is an object of this invention to provide a WDM system that utilizes inexpensive commercially available uncooled lasers.

SUMMARY OF THE INVENTION

In accordance with the invention, there is provided, an optical system having at least a first and a second channel the first channel having a central wavelength $\lambda c1$ and having a bandwidth of q nanometers, the channel having lowest wavelength of $\lambda c_1 - q/2$ and a highest wavelength within its band of $\lambda c_1 + q/2$, the second channel having a central wavelength $\lambda c_2$ and having a bandwidth of q nanometers, the channel having lowest wavelength of $\lambda c_2 - q/2$ and a highest wavelength within its band of $\lambda c_2 + q/2$, wherein $\lambda c_2 > \lambda c_1 + q/2$, the optical system comprising:

optical filtering means for filtering the first and second channels, said filtering means having a peak transmission or reflection response substantially about the wavelength $\lambda c1$ and having a bandwidth corresponding to the first channel of q nanometers, and having a peak transmission or reflection response substantially about the wavelength $\lambda c2$ and having a bandwidth corresponding to the second channel of q nanometers; a first uncooled laser for being optically coupled to the waveguide, the laser having a lasing wavelength $\lambda_{laser1}$ corresponding to the first channel, wherein $\lambda c1 - q/2 \leq \lambda_{laser1} \leq \lambda c1 - \lambda q/8$ at an ambient operating temperature; and, a second uncooled laser for being optically coupled to the waveguide, the laser having a lasing wavelength $\lambda_{laser2}$ corresponding to the second channel, wherein $\lambda c_2 - q/2 \leq \lambda_{laser2} \leq \lambda c_2 - q/8$ at an ambient operating temperature.

In accordance with the invention an optical system is provided having n channels, the channels having sequential central wavelengths of $\lambda 1$, $\lambda 2$, $\lambda 3$ to $\lambda n$ respectively, each of the n channels having a bandwidth of q nanometers, wherein channel 1 having a central wavelength of $\lambda 1$, has a lowest wavelength of $\lambda 1 - q/2$ and a highest wavelength within its band of $\lambda 1 + q/2$ and subsequent channels have a central wavelength of $\lambda s$ and have a lowest wavelength of $\lambda s - q/2$ and a highest wavelength within its band of $\lambda s + q/2$, for s= 2, 3, . . . n. The optical system comprises a multiplexor/demultiplexor for multiplexing and demultiplexing signals of different wavelengths to and from a waveguide; n uncooled lasers for being optically coupled to the waveguide, each of the n lasers having a lasing wavelength corresponding to a different one of the n channels, the lasing wavelength of a first laser corresponding to channel 1, having a lasing wavelength of $\lambda_{laser1}$, wherein $\lambda 1 - q/2 \geq \lambda_{laser1} < \lambda 1$ at an ambient operating temperature, and, a second of the n lasers corresponding to channel 2 has a lasing wavelength of $\lambda_{laser2}$, wherein $\lambda 2 - q/2 \leq \lambda_{laser2} < \lambda 2$ at an ambient operating temperature, and so on, such that subsequent lasers corresponding to subsequent channels s have a lasing wavelength $\lambda_{laser}s$, wherein $\lambda s - q/2 \leq \lambda_{laser}s < \lambda s$ at an In accordance with another aspect of the invention, an optical system having n channels is provided, the channels have central wavelengths of $\lambda 1$, $\lambda 2$, $\lambda 3$ to $\lambda n$ respectively, the n channels having predetermined respective bandwidths of $q_1$, $q_2$, $q_3$, . . . $q_n$, wherein channel 1 has a central wavelength of $\lambda 1$, a lowest wavelength of $\lambda 1 - q_1/2$ and a highest wavelength within its band of $\lambda 1 + q_1/2$. Subsequent channels s have a central wavelength of $\lambda s$ and have a lowest wavelength of $\lambda s - q_s/2$ and a highest wavelength of $\lambda s + qs/2$, for channels s=2, 3, . . . n. The optical system comprises: n uncooled lasers for operating within the n channel system, each of the n lasers having a lasing wavelength corresponding to a different one of the n channels, the lasing wavelength of a first laser corresponding to channel 1, having a lasing wavelength of $\lambda_{laser1}$, wherein $\lambda 1 - q_1/2 \leq \lambda_{laser1} < \lambda 1$ at an ambient operating temperature, and, a second of the n lasers corresponding to channel 2 has a lasing wavelength of $\lambda_{laser2}$, wherein $\lambda 2 - q_2/2 \leq \lambda_{laser2} < \lambda 2$ at an ambient operating temperature, and so on, such that subsequent lasers corresponding to subsequent channels s have a lasing wavelength $\lambda_{laser}s$, wherein $\lambda s - q_s/2 \leq \lambda_{laser}s < \lambda s$ for s=3, . . . n, at an ambient operating temperature.

Furthermore, an n channel system can be upgraded and expanded by selectively replacing at least one channel having a predetermined bandwidth with a plurality of sub-channels having a narrower bandwidth, thereby providing a hybrid optical system having a plurality of channel types.

BRIEF DESCRIPTION OF THE DRAWINGS

Exemplary embodiments of the invention will now be described in conjunction with the drawings, in which.

DETAILED DESCRIPTION

Figure 7:
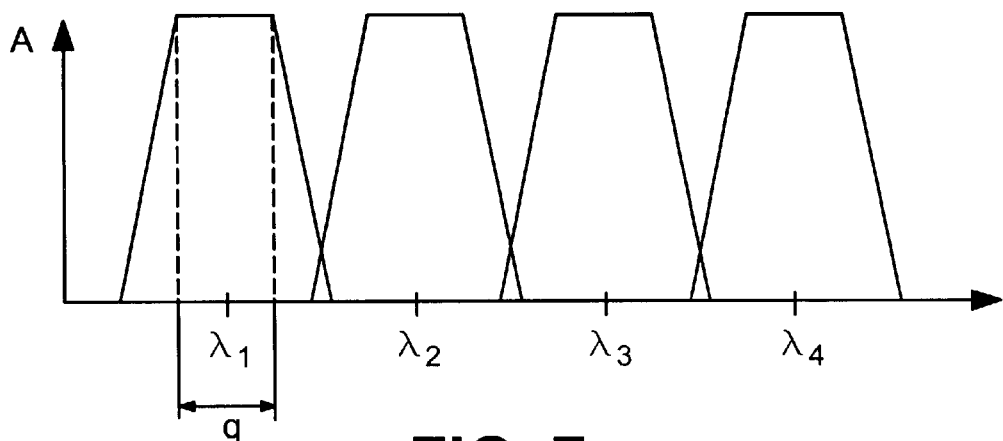
FIG. 7 is a diagram depicting a 4 channel optical system having a wavelength range corresponding to an ITU wavelength range for a 100 GHz 40 channel system.

Generally in communications systems, lasers are selected to have a lasing wavelength at ambient conditions that corresponds to a central wavelength of a transmitting channel. The output response for such a system is shown in FIG. 7 wherein a 4-channel system is shown having four centre wavelengths $\lambda 1$, $\lambda 2$, $\lambda 3$, and $\lambda 4$, provided by four optical signal generators, for example lasers, each having a wavelength at ambient temperature that corresponds to a centre wavelength of each channel.

Since the channels are n nanometers wide, the system requires lasers that will drift less than n/2 nanometers with changes in operating conditions, for example when operating between 25° C. to 50° C., and/ or, in the presence of signal reflections that may be present. In a system having substantially narrower channels, isolators are typically provided to prevent the laser's energy from reflecting backwards into the laser. In the absence of isolators when back reflections do couple back into the laser, the line width of the lasers light generally broadens, resulting in laser mode hop. By providing a system with substantially wide channels, mode hop can be tolerated since it will usually be confined to the band in which it generated. Furthermore the system must be tolerant of aging of the lasers. In instances where n is large, and hence, the operating bandwidth of each channel is sufficiently broad, using standard relatively inexpensive lasers may suffice, however temperature compensation in such a system may be required when operating temperatures become excessively high.

Figure 9:
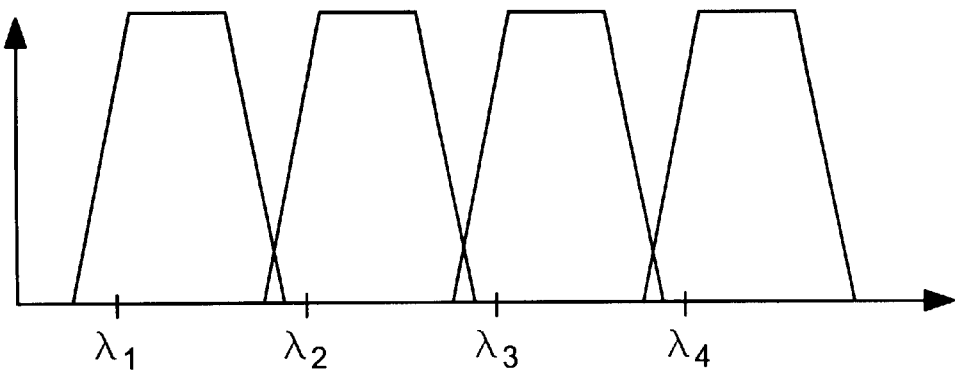
FIGS. 9a and 9b illustrate a detailed exemplary embodiments of a bandwidth allocation diagram and minimum filter bandwidth.
FIGS. 9c and 9d are graphs illustrative of a two channel system wherein a first channel has a central wavelength $\lambda 1_c$ and a second channel has a central wavelength $\lambda 2_c$

Referring now to FIG. 9, an output response for a system in accordance with an aspect of this invention is shown, wherein the wavelengths of the lasers operating at ambient temperature are substantially below the centre wavelength of their respective channels. By providing lasers that have a wavelength substantially less than the centre wavelength at ambient operating temperature, an increased margin of bandwidth results for allowing the lasers to operate within their allotted band, so as to ensure they remain at a wavelength below their maximum wavelength as the operating temperature increases. This in effect provides increased tolerance to drift, since the operating environment in which the lasers must function tends to increase above ambient in a worst case. Temperature control circuitry including an inexpensive heating element is provided (not shown) to ensure temperature of the lasers is at least 20 degrees C. However, by ensuring that the operating wavelength of the laser at room temperature for each channel is in the lower wavelength range of each channel, and that each channel has a broad enough bandwidth to accommodate for the laser drift, expensive stabilized lasers having coolers such as Peltier coolers are not required. Furthermore, these inexpensive lasers do not require built in isolators in order to avoid back reflections which are known to cause a broadening of the signal. Since the allowable bandwidth of each channel is relatively broad, slight increase in a particular channel is not deleterious to the system.

Figure 9A:
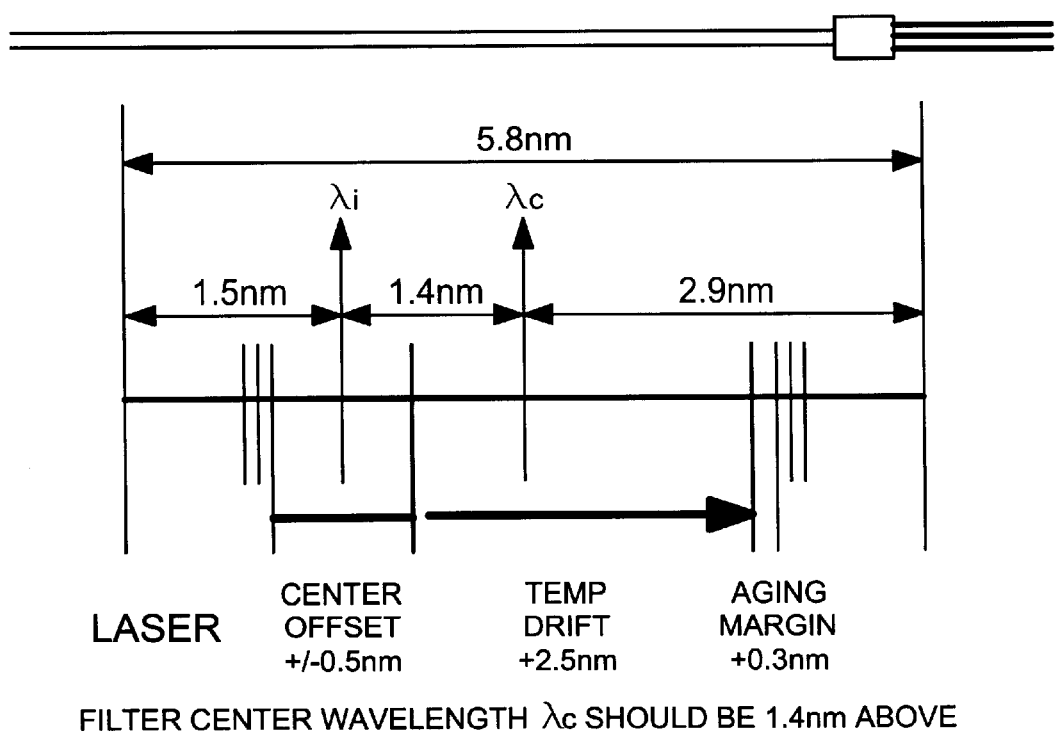
Figure 9B:
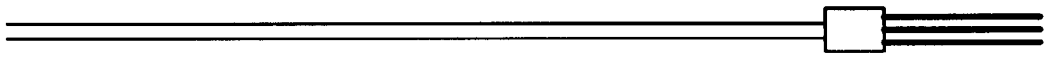

FIG. 9a and the table on FIG. 9b illustrate a detailed exemplary embodiment of a bandwidth allocation diagram and minimum filter bandwidth to accommodate a low cost laser having a lasing wavelength of $\lambda i$ which is substantially lower in wavelength than a selected central channel wavelength within which it is to operate. In constructing an optical system, optical filters must be provided for multiplexing/demultiplexing optical channels to and from a primary waveguide. For the optical system referred to in FIG. 9a, it is known that an uncooled laser having a central wavelength $\lambda i$ corresponding to an ITU central wavelength requires an optical filter that is compatible with the laser's central wavelength $\lambda i$. The table of FIG. 9b illustrates a calculation of a minimum filter bandwidth of 5.8 nm. This takes into consideration the tolerance, temperature drift and aging for a temperature range of 25–50 degrees C. Furthermore, the tolerance, temperature drift and aging of the filter from 0–50 degrees C is considered and included in the calculation to yield a filter design having a bandwidth q=5.8 nm which is the selected value for each channel within this exemplary optical system. Referring now specifically to FIG. 9a, the channel having a bandwidth of 5.8 nm is shown to have a central bandwidth of $\lambda c$ which is offset by 1.4 nm from the wavelength of the laser $\lambda i$. It is also noted that the laser wavelength $\lambda i$ is 1.5 nm from the lowest wavelength of this channel. This margin of 1.5 nm is provided as a guard band in part to allow for tolerance in the filter itself. In summary, once the wavelength of the laser is known i.e. $\lambda i$ in this instance, the lower channel wavelength can be established by considering the filter parameters and constraints, and the upper channel wavelength can be established by considering the parameters and constraints of the laser and filter which must be considered in tandem.

Figure 9C:
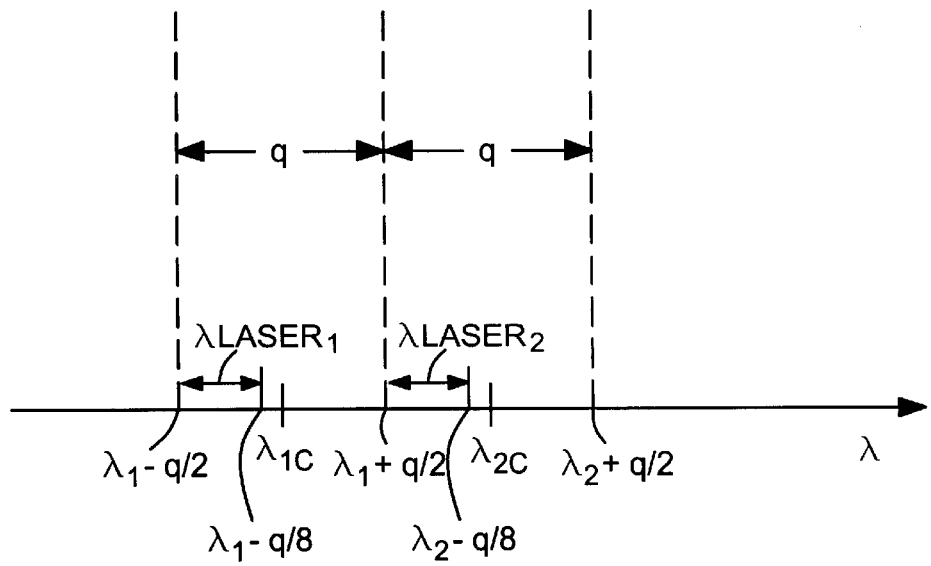
Figure 9D:
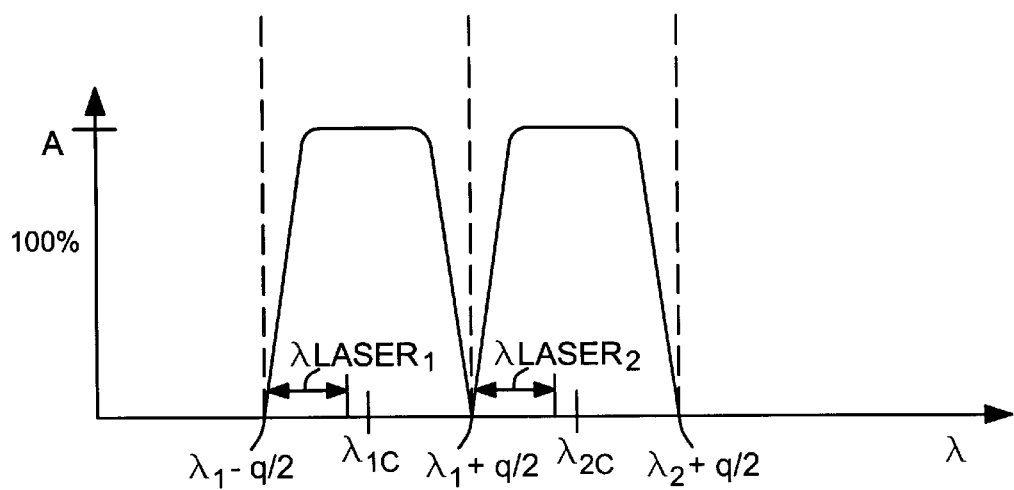

FIGS. 9c and 9d are illustrative of a two channel system wherein a first channel has a central wavelength $\lambda 1_c$ and a second channel has a central wavelength $\lambda 2_c$ and wherein both channels are q nanometers in bandwidth. FIG. 9d shows a transmission response of first filter having a central bandwidth and transmission peak at $\lambda 1_c$ and a second filter having a central bandwidth and transmission peak at $\lambda 2_c$. Of course a single filter can be designed having the combined response of the first and second filter, in either transmission or reflection. It should be noted from these two figures that the system in this exemplary embodiment is designed such that $\lambda_{laser1}$ is between $\lambda 1-q/8$ and the lower boundary of $\lambda 1-q/2$. Similarly $\lambda_{laser2}$ is between $\lambda 2-q/8$ and the lower boundary of $\lambda 2q/2$.

Figure 10:
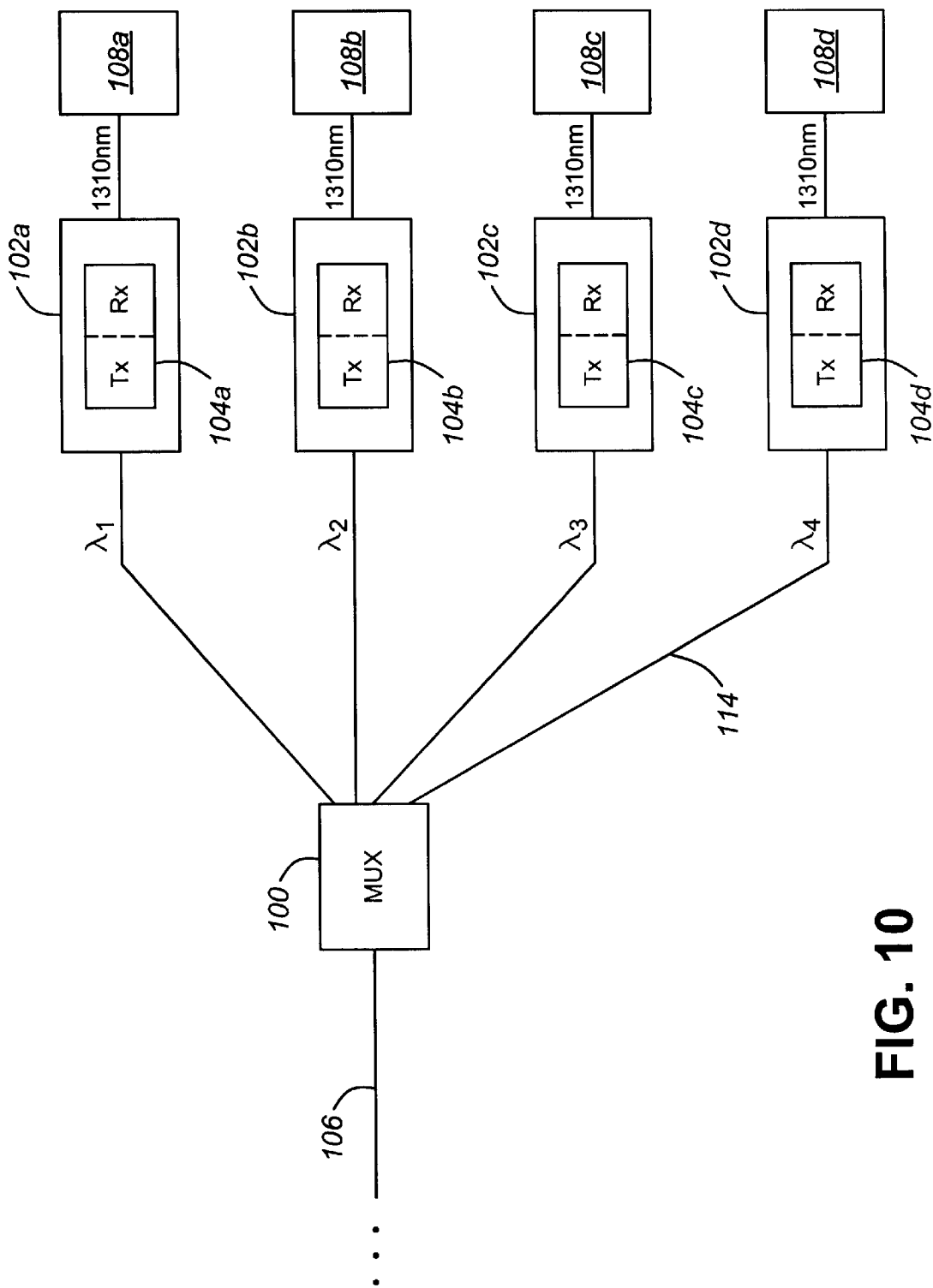
FIG. 10 is a schematic block diagram of an optical system having 4 channels; and, FIG. 11 is a schematic block diagram of an optical system in accordance with the invention, wherein one of the channels, shown in FIG. 10 has been expanded into 10 narrower channels.

Turning now to FIG. 10 a 4 channel optical system in accordance with the invention is shown. Data signals transmitted by transmitters at subscribers' premises 108a to 108d are provided to respective transponders 102a to 102d. These 1310 nm optical signals are converted by transceivers 104a to 104d to signals of wavelengths $\lambda 1$ to $\lambda 4$ respectively. A multiplexor 100 designed to receive input signals in the wavelength band between and including $\lambda 1$ to $\lambda 4$ multiplexes the four signals corresponding to four channels into a single signal onto the optical fibre 106. This optical system depicted in FIG. 10 provides a required functionality at a relatively low cost to subscribers. For example, the transponders 102a to 102d are relatively inexpensive devices and do not require expensive coolers. This is due to the fact that a wide window is provided within which they must operate, allowing suitable tolerance to variation in the laser's wavelength.

Figure 1:
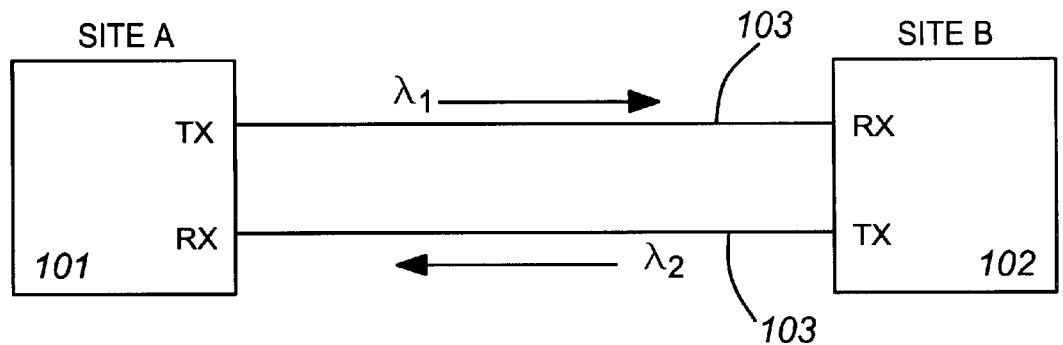
FIGS. 1, 2 and 4 are block-diagram representations of some conventional fibre optic communication systems as discussed in more detail above.
Figure 2:
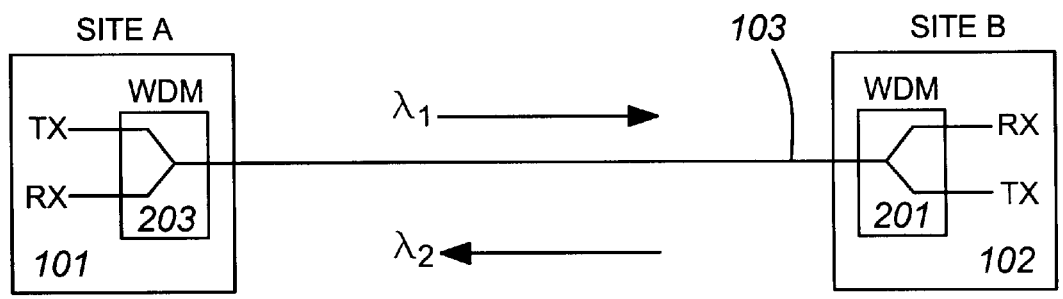
Figure 3:
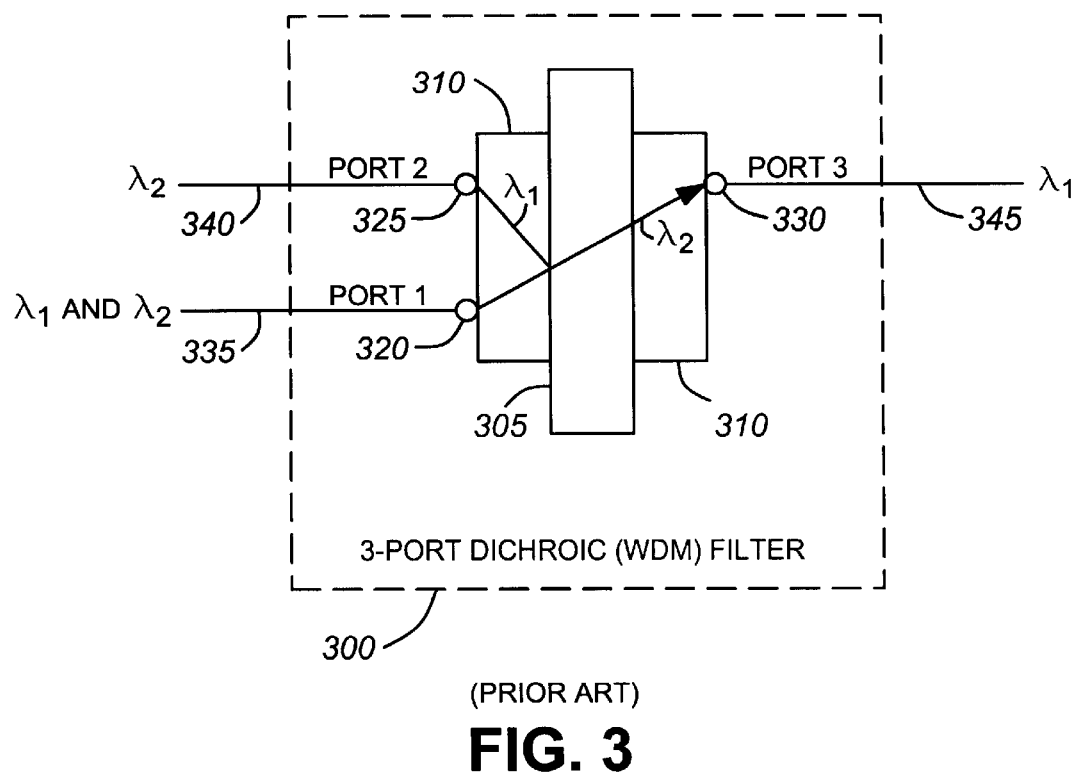
FIG. 3 is a block diagram representation of a conventional three-port wavelength-division multiplexer filter.
Figure 4:
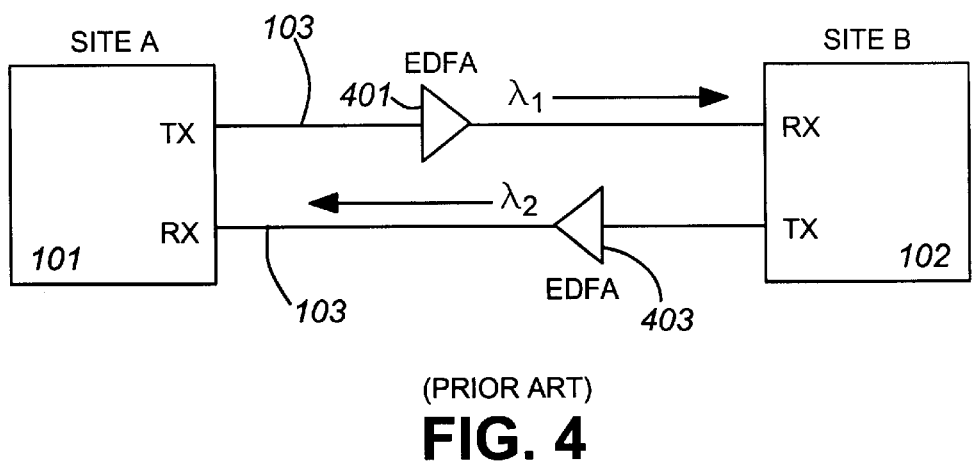
Figure 5:
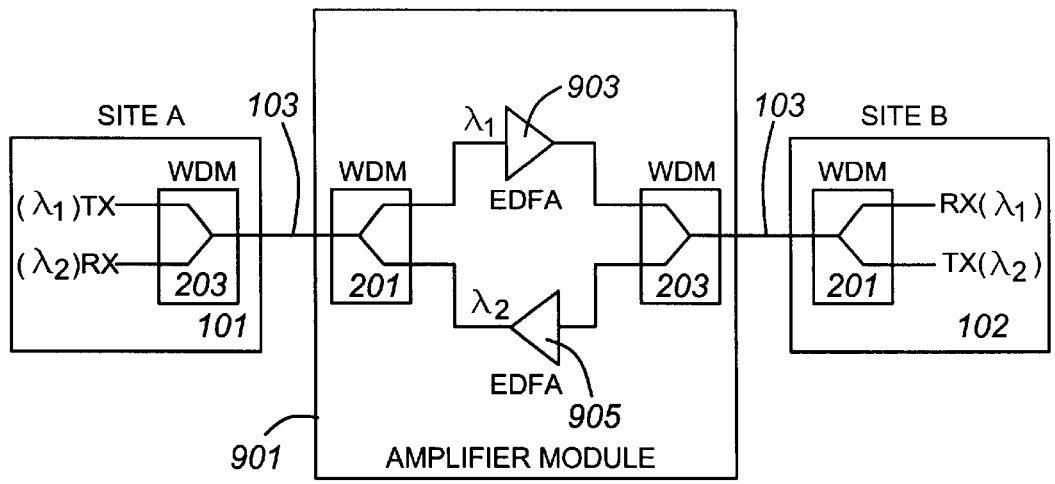
FIG. 5 is a block diagram representation of a prior art single-module amplifier for bidirectional transmission employing wavelength-division multiplexing and erbium-doped fibre amplifier technology.
Figure 6:
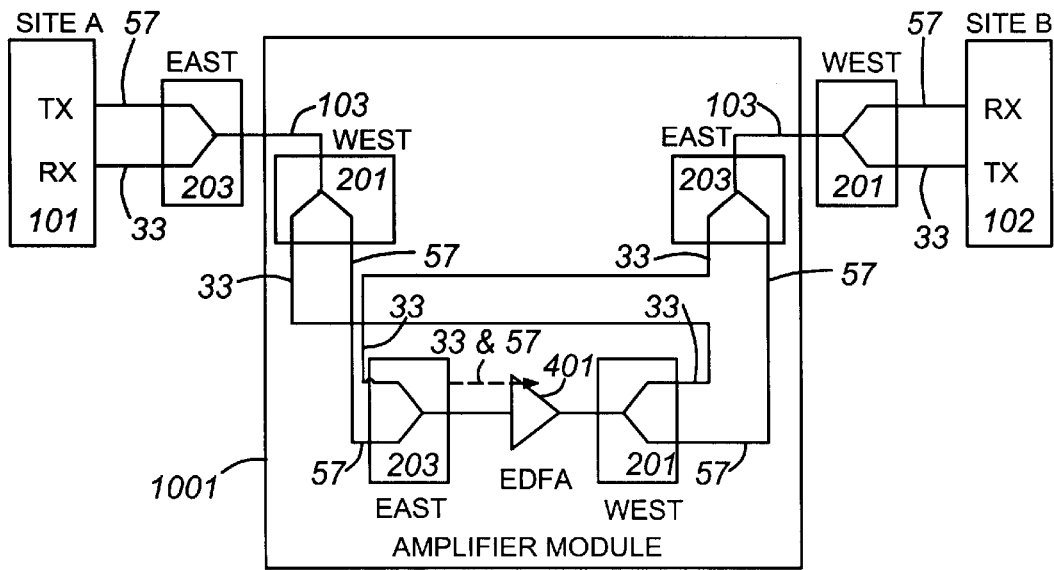
FIG. 6 is a block diagram representation of a prior art bidirectional optical amplifier module comprising a single erbium-doped fibre amplifier and four conventional three-port wavelength-division multiplexers.

Depending upon the requirements, the response of the system in FIG. 4 is exemplified by the circuits shown in FIG. 7 or FIG. 9, the latter being the preferred embodiment providing increased tolerance to laser drift as a result of a temperature increase.

Figure 8:
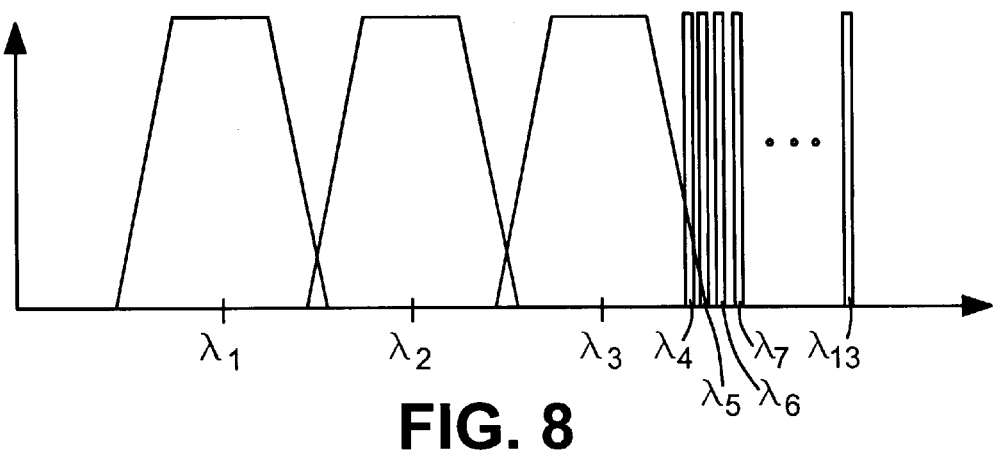
FIG. 8 is a diagram depicting the 4 channel optical system of FIG. 7, wherein one of the channels has been replaced with 10 narrower channels; and, FIG. 9 is a diagram depicting a 4 channel optical system having a wavelength range corresponding to an ITU wavelength range for a 100 GHz 40 channel system and wherein the laser wavelength at room temperature of each channel is in the lower wavelength range of each channel.
Figure 11:
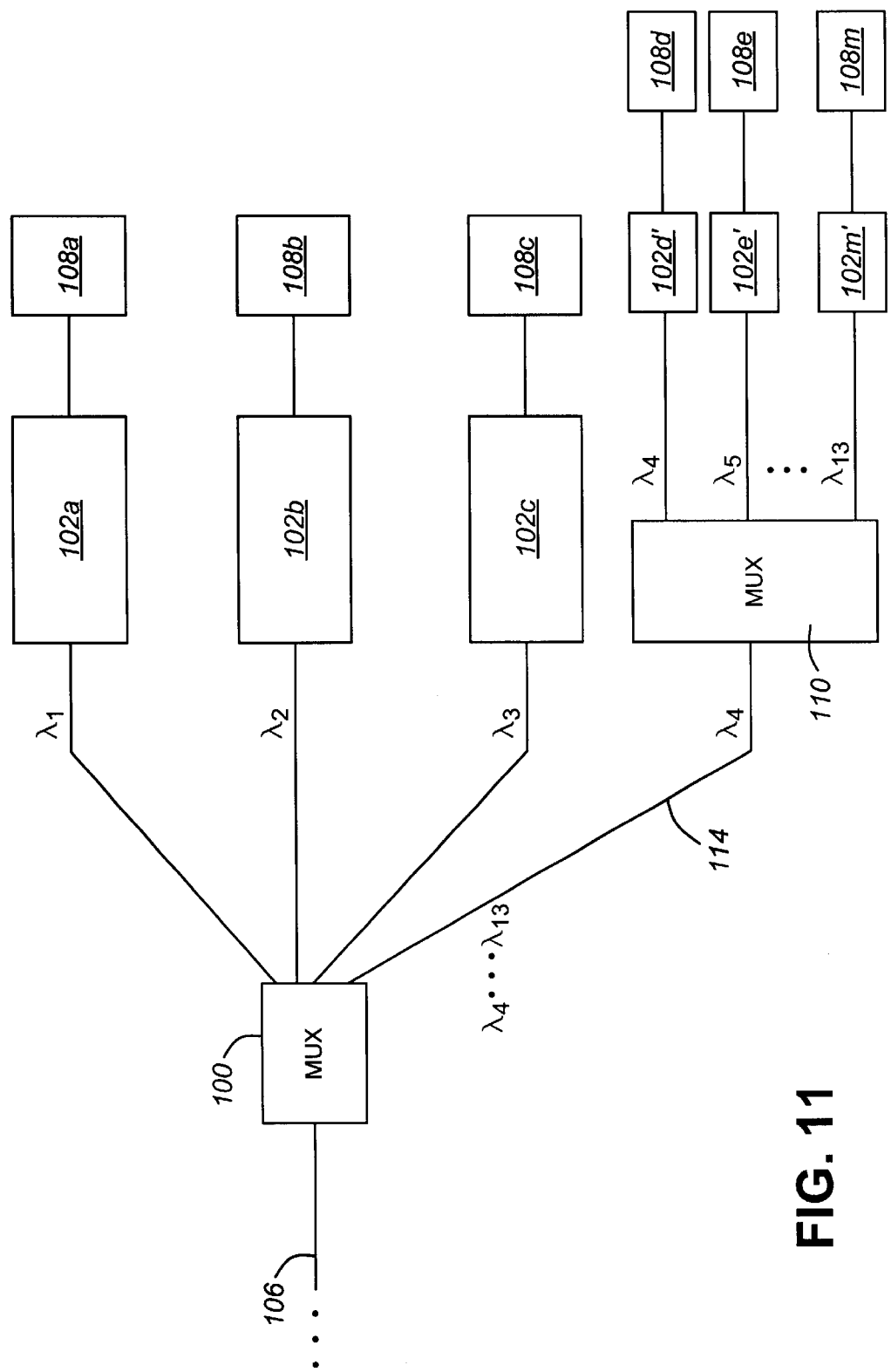

Referring now to FIG. 11, a modified circuit, similar to the circuit of FIG. 10 in many respects, is shown. In FIG. 11 the transponder 102d of FIG. 10 has been replaced with a 10:1 multiplexor capable of multiplexing ten wavelengths $\lambda 4$ to $\lambda 13$ onto a single fibre 114, and with ten Peltier cooled lasers within transponders 102d' to 102m' dedicated to subscribers 108d to 108m'. These stabilized lasers are considerably more costly than the uncooled lasers used in FIG. 10 and are capable of operating within a very narrow bandwidth. In the response of the system shown in FIG. 8, it is evident that the width of channels corresponding to wavelengths $\lambda 4$ to $\lambda 13$ is considerably less than the width of the channels corresponding to wavelengths $\lambda 1$ to $\lambda 3$.

In order to expand the 4 channel system shown if FIG. 10 to the 13 channel system shown if FIG. 11, only one subscriber 108*d* needs to be temporarily disturbed. The other three subscribers will likely be unaware of the system change as it is taking place.

What is claimed is:

1. An optical system having n channels, the channels having sequential central wavelengths of λ1, λ2, λ3 to λn respectively, each of the n channels having a bandwidth of q nanometers, wherein channel 1 having a central wavelength of λ1, has a lowest wavelength of λ1−q/2 and a highest wavelength within its band of λ1+q/2 and subsequent channels have a central wavelength of λs and have a lowest wavelength of λs−q/2 and a highest wavelength within its band of λs+q/2, for s=2, 3, . . . n, the optical system comprising:

multiplexor/demultiplexor for multiplexing and demultiplexing signals of different wavelengths to and from a waveguide;

n uncooled lasers for being optically coupled to the waveguide, each of the n lasers having a lasing wavelength corresponding to a different one of the n channels, the lasing wavelength of a first laser corresponding to channel 1, having a lasing wavelength of substantially about $\lambda_{laser1}$, wherein $\lambda 1-q/2 \leq \lambda_{laser1} < \lambda 1$ at an ambient operating temperature, and, a second of the n lasers corresponding to channel 2 has a lasing wavelength of substantially about $\lambda_{laser2}$, wherein $\lambda 2-q/2 \leq \lambda_{laser2} < \lambda 2$ at an ambient operating temperature, and so on, such that subsequent lasers corresponding to subsequent channels s have a lasing wavelength substantially about $\lambda_{laser}s$, wherein $\lambda s-q/2 \leq \lambda_{laser}s < \lambda s$ at an ambient operating temperature.

2. An optical system having n channels as defined in claim 1, wherein at least some of the uncooled lasers are heated.

3. An optical system as defined in claim 2 wherein the n uncooled lasers are heated to a temperature of at least 20° C.

4. An optical system as defined in claim 1 wherein the channel width q nanometers is sufficiently wide so as to allow the system to function in the presence of some back reflection that may be present in the absence of isolators coupled to the n uncooled lasers.

5. An optical system having n channels, the channels having central wavelengths of λ1, λ2, λ3 to λn respectively, the n channels having predetermined respective bandwidths of $q_1$, $q_2$, $q_3$, . . . $q_n$, wherein channel 1 having a central wavelength of λ1, has a lowest wavelength of $\lambda 1-q_1/2$ and a highest wavelength within its band of $\lambda 1+q_1/2$ and subsequent channels s have a central wavelength of λs and have a lowest wavelength of $\lambda s-q_s/2$ and a highest wavelength of $\lambda s+q_s/2$, for s=2, 3, . . . n, the optical system comprising:

n uncooled lasers for operating within the n channel system, each of the n lasers having a lasing wavelength corresponding to a different one of the n channels, the lasing wavelength of a first laser corresponding to channel 1, having a lasing wavelength of $\lambda_{laser1}$, wherein $\lambda 1-q_1/2 \leq \lambda_{laser1,} <\lambda 1$ at an ambient operating temperature, and, a second of the n lasers corresponding to channel 2 has a lasing wavelength of $\lambda_{laser2}$, wherein $\lambda 2-q_2/2 \leq \lambda_{laser2} < \lambda 2$ at an ambient operating temperature, and so on, such that subsequent lasers corresponding to subsequent channels s have a lasing wavelength $\lambda_{laser}s$, wherein $\lambda s-q_s/2 \leq \lambda_{laser}s < \lambda s$ for s=3, . . . n, at an ambient operating temperature.

6. An optical system as defined in claim 5, wherein the predetermined bandwidths $q_1$, $q_2$, $q_3$, . . . $q_n$ are all substantially equal.

7. An optical system as defined in claim 5 further comprising a multiplexor/demultiplexor for multiplexing and demultiplexing signals of different wavelengths from the n uncooled laser to a waveguide.

8. An optical system as defined in claim 5 wherein the n uncooled lasers are also unisolated lasers.

9. An optical system as defined in claim 8 wherein the channels width of each of the channels is sufficiently wide so as to allow the system to function in the presence of some back reflection that may be present.

10. An optical system as defined in claim 5 wherein the channel widths is sufficiently wide so as to allow the system to function in the presence of some back reflection that may be present in the absence of isolators coupled to the n uncooled lasers.

11. An optical system having n channels as defined in claim 5, wherein at least some of the uncooled lasers are heated.

12. An optical system as defined in claim 11 wherein the n uncooled lasers are heated to a temperature of at least 20° C.

13. A system comprising: p+n contiguous channels, each of the n channels having a bandwidth of q nanometers and each of the p channels having a bandwidth of j nanometers, j being substantially less than q;

n uncooled lasers each laser for transmitting at an ambient temperature a wavelength lower than a central wavelength of a predetermined channel of the n channels; and, p cooled optical signal sources for operating within the p channels, wherein the p channels are sequential channels, the p channels having a combined operating bandwidth less than or equal to q nanometers.

14. An optical system having n channels as defined in claim 13, wherein at least some of the uncooled lasers are heated.

15. An optical system as defined in claim 14 wherein the n uncooled lasers are heated to a temperature of at least 20° C.

16. An optical communication system comprising:

an optical waveguide for transmitting a multiplexed optical signal comprising a plurality of wavelengths corresponding to a plurality of channels;

a plurality of separated multiplexor/demultiplexors optically coupled to different portions of the waveguide for multiplexing and demultiplexing the plurality of wavelengths;

n uncooled lasers for providing n optical signals coupled to at least one of the multiplexor/demultiplexors, each of the lasers corresponding to and operable within a different one of n sequential channels, n being an integer greater than one, each channel having a bandwidth of q nanometers, each laser having an operating wavelength at ambient temperature corresponding to a wavelength below a central wavelength of a respective channel;

p lasers having cooling means coupled to at least one of the multiplexor/demultiplexors for providing p optical signals, each of the lasers corresponding to and operable within a different one of p channels, p being an integer greater than one, each channel having a bandwidth of j nanometers, wherein j,<q, each laser having a centre operating wavelength corresponding to a wavelength at the centre of a respective channel; and receiver means for receiving the optical signals.

17. An optical system having n channels as defined in claim 10, wherein at least some of the uncooled lasers are heated.

18. An optical system having at least a first and a second channel the first channel having a central wavelength $\lambda c_1$ and having a bandwidth of q nanometers, the channel having lowest wavelength of $\lambda c_1-q/2$ and a highest wavelength within its band of $\lambda c_1+q/2$, the second channel having a central wavelength $\lambda c_2$ and having a bandwidth of q nanometers, the channel having lowest wavelength of $\lambda c_2-q/2$ and a highest wavelength within its band of $\lambda c_2+q/2$, wherein $\lambda c_2 > \lambda c_1+q/2$, the optical system comprising:

optical filtering means for filtering the first and second channels, said filtering means having a peak transmission or reflection response substantially about the wavelength $\lambda c1$ and having a bandwidth corresponding to the first channel of q nanometers, and having a peak transmission or reflection response substantially about the wavelength $\lambda c2$ and having a bandwidth corresponding to the second channel of q nanometers;

a first uncooled laser for being optically coupled to the waveguide, the laser having a lasing wavelength $\lambda_{laser1}$ corresponding to the first channel, wherein $\lambda c1-q/2 \leq \lambda_{laser1} \leq \lambda c1-q/8$ at an ambient operating temperature; and, a second uncooled laser for being optically coupled to the waveguide, the laser having a lasing wavelength $\lambda_{laser2}$ corresponding to the second channel, wherein $\lambda c_2-q/2 \leq \lambda_{laser2} \leq \lambda c_2-q/8$ at an ambient operating temperature.

19. An optical system as defined in claim 18, wherein the optical filtering means for filtering channel data to or from the waveguide comprises at least two optical filters.

20. An optical system as defined in claim 18 wherein the n uncooled lasers are heated to a temperature of at least 20° C.

* * * * *